United States Patent [19]

Kawamoto et al.

[11] Patent Number: 4,968,752

[45] Date of Patent: Nov. 6, 1990

[54] IONOMER COMPOSITION

[75] Inventors: Manabu Kawamoto; Yasuhisa Hosoai; Eisaku Hirasawa, all of Ichihara, Japan

[73] Assignee: Du Pont-Mitsui Polychemicals Co., Ltd., Japan

[21] Appl. No.: 471,940

[22] Filed: Jan. 29, 1990

[51] Int. Cl.$^5$ .................. C08L 23/26; C08L 23/16; C08L 33/02; C08L 37/00

[30] Foreign Application Priority
Jan. 31, 1990 [JP] Japan ................. 63-19490

[52] U.S. Cl. ................... 525/194; 525/196; 525/208; 525/211; 525/221; 525/193; 524/517

[58] Field of Search .................. 525/194, 196, 208

[56] References Cited

U.S. PATENT DOCUMENTS 4,554,316 11/1985 Sakano et al. ................. 525/71
4,898,911 2/1990 Miyashita et al. .............. 525/208

FOREIGN PATENT DOCUMENTS 61-36344  2/1986  Japan .
61-36347  2/1986  Japan .
62-141019 6/1987  Japan .
1-009254  1/1989  Japan .

*Primary Examiner*—Carman J. Seccuro
*Attorney, Agent, or Firm*—Webb, Burden, Ziesenheim & Webb

[57] ABSTRACT

Proposed herein is an ionomer composition which comprises a reaction product of from 90 to 99.5% by weight of an ethylene copolymer-type ionomer (A) with from 0.5 to 10% by weight of an olefin copolymer (B) having epoxy groups in its side chains, and from 5 to 200 parts by weight, based on 100 parts by weight of said reaction product, of an olefin-type thermoplastic elastomer (C). The proposed ionomer composition is excellent in scratch resistance and flexibility and exhibits a reduced "luster reappearance".

4 Claims, No Drawings

IONOMER COMPOSITION

FIELD OF THE INVENTION

The present invention relates to an ionomer composition which is excellent in scratch resistance, impact strength, heat resistance and flexibility. More particularly, it relates to an ionomer composition comprising a reaction product of an ethylene copolymer-type ionomer, which may be referred to herein briefly as an ionomer, with an olefin copolymer having epoxy groups in its side chains, and an olefin-type thermoplastic elastomer.

PRIOR ART

Because ionomer resins are light in weight and rigid, and are excellent in scratch resistance and impact strength at cold atmospheric temperatures, they draw attention of the art as attractive resins for use in automotive exteriors.

In some applications, including automotive interiors such as materials for lining doors, further improvements of the ionomer resins in flexibility and heat resistance are desired in the art, while enjoying their advantageous properties such as excellent scratch resistance and impact strength at cold atmospheric temperature. The heat resistance required for materials used in such applications includes, in addition to usual resistance to heat deformation, such a property that the surfaces of the materials do not cause a phenomenon called "luster reappearance" due to heat. Generally, surfaces of lining materials are delustered by embossing. However, it is frequently observed that when an embossed lining material is subjected to an elevated temperature as high as 120° C., which is the supposed highest temperature inside automobiles, it melts due to heat whereby the surface of the material may lose the emboss to become smooth and reappearance luster before the embossing. This phenomenon is called "luster reappearance". Thus, materials for use in lining automotive doors are required that they are not suffered from "luster reappearance".

In applications where scratch resistance is of paramount importance, it is necessary to use such ionomer resins that they contain increased amounts of metallic ions. The higher the metallic ion content becomes, however, ionomer resins tend to become more rigid and more lustrous. It is not easy to make such ionomer resins delustrous by embossing. It is therefore desired to provide ionomer resins which are excellent in flexibility as well as scratch resistance.

Our Japanese Patent Laid-open Publication No. 61-36347 discloses a polymer composition having excellent scratch resistance and heat deformation resistance comprising an ionomer and an olefin-type thermoplastic elastomer. While the proposed polymer composition is excellent in resistance to heat deformation, it is insufficient in respect of the above-mentioned "luster reappearance".

Japanese Patent Laid-open Publication No. 63-165448 discloses and claims a resin composition having an improved impact resistance comprising (a) from 5 to 95 parts by weight of a resin having at least one epoxy group in its molecule and a flexural modulus of not more than 10,000 kg/cm$^2$ at room temperature melt blended with (b) from 95 to 5 parts by weight of a copolymer of an α-olefin and an α, β-unsaturated carboxylic acid having at least 5 mol % of its carboxyl groups neutralized with an alkali metal salt and a flexural modulus of not more than 10,000 kg/cm$^2$ at room temperature.

OBJECT OF THE INVENTION

In view of the state of the art discussed above, an object of the invention is to provide an ionomer composition which is excellent in scratch resistance and flexibility and exhibits a reduced "luster reappearance".

DESCRIPTION OF THE INVENTION

It has now been found that an ionomer composition having a well-balanced combination of the desired properties can be obtained by reacting an ethylene copolymer-type ionomer with an olefin copolymer having epoxy groups in its side chains, and incorporating the resulting reaction product with an olefin-type thermoplastic elastomer.

Thus, the invention provides an ionomer composition which comprises a reaction product of from 90 to 99.5% by weight of an ethylene copolymer-type ionomer (A) with from 0.5 to 10% by weight of an olefin copolymer (B) having epoxy groups in its side chains, and from 5 to 200 parts by weight, based on 100 parts by weight of said reaction product, of an olefin-type thermoplastic elastomer (C).

The ionomer composition according to the invention will now be described in detail.

The ethylene copolymer-type ionomer (A) used herein comprises ethylene units and unsaturated carboxylic acid salt units as essential polymer constituent units, and optionally contains unsaturated acid units, unsaturated acid ester units and other comonomer units. Such an ionomer (A) may be prepared either from an ethylene-unsaturated carboxylic acid copolymer comprising ethylene units, unsaturated carboxylic acid units and optionally other comonomer units by neutralizing at least a part of its unsaturated carboxylic acid units with a metallic ion and/or an organic amine, or from an ethylene-unsaturated carboxylic acid ester copolymer comprising ethylene units, carboxylic acid ester units and optionally other comonomer units by saponifying at least a part of its unsaturated acid ester units.

In the starting ethylene-carboxylic acid copolymer comprising ethylene units, unsaturated carboxylic acid units and optionally other comonomer units, the unsaturated carboxylic acid units are derived from at least one unsaturated carboxylic acid preferably having from 3 to 8 carbon atoms. Examples of such an unsaturated carboxylic acid, include, for example, acrylic acid, methacrylic acid, fumaric acid, itaconic acid, maleic anhydride, monomethyl maleate and monoethyl maleate. Of these, preferred are acrylic acid, methacrylic acid and maleic anhydride. The unsaturated carboxylic acids may be incorporated in the copolymer by either random or graft copolymerization. From the stand point of transparency of the ionomer, they are preferably random copolymerized. The optional third comonomer units may be derived from at least one other comonomer. Examples of such a third comonomer include esters of unsaturated carboxylic acids such as methyl acrylate, ethyl acrylate isopropyl acrylate, n-butyl acrylate, 2-ethylhexyl acrylate and methyl methacrylate, and alkenyl esters of saturated carboxylic acids such as vinyl acetate.

The ethylene-unsaturated carboxylic acid copolymers for use in the preparation of the ethylene copolymer-type ionomer (A) used herein desirably comprise from 40 to 99% by weight, preferably from 50 to 98% by weight, of the ethylene units and from 1 to 50% by weight, preferably from 2 to 40% by weight, of the unsaturated carboxylic acid units. When the starting ethylene-unsaturated acid copolymer contains the third comonomer units, they should be present in the copolymer in an amount of not exceeding 50% by weight, preferably not exceeding 40% by weight.

The starting ethylene-unsaturated carboxylic acid copolymer is at least partly neutralized with metallic cations having a valency of from 1 to 3 and/or organic amines to provide the ethylene copolymer-type ionomer (A) which can be used herein. Examples of the usable metallic cations include, for example, $Na^+$, $K^+$, $Li^+$, $Ca^{++}$, $Mg^{++}$, $Zn^{++}$, $Cu^{++}$, $Co^{++}$, $Ni^{++}$, $Mn^{++}$ and $Al^{+++}$. Examples of usable organic amines include, for example, n-hexylamine, hexamethylenediamine, 1,3-bisaminomethylcyclohexane and mxylenediamine. The neutralization result in the formation of carboxylic acid salt units, which will act as a catalyst for the reaction between the carboxylic groups of the ionomer (A) and epoxy groups of the olefin copolymer (B) having epoxy groups in its side chains. In the absence of the carboxylic acid salt units, the reaction tends to unevenly proceed so that marked improvements in mechanical properties of the reaction product at elevated temperatures will not be achieved. The neutralizing agents may be used alone or in combination.

Preferred ionomers which can be used herein may be obtained by preparing a copolymer of ethylene, at least one unsaturated carboxylic acid and optionally one or more third comonomer by a high pressure radical polymerization process, and neutralizing at least a part, normally from 5 to 95%, preferably from 10 to 90% of carboxyl groups of the copolymer with metallic cations. Preferred ionomers which can be used herein generally have a melting point within the range between 70 and 105° C. and a melt flow rate (MFR) of from 0.01 to 1000 g/10 min, in particular from 0.1 to 200 g/10 min, measured at a temperature of 190° C. and under a load of 2160 g.

As the olefin-copolymer (B) having epoxy groups in its side chains particularly preferred are copolymers of at least one α-olefin with at least one ethylenically unsaturated glycidyl compound selected from glycidyl acrylate, glycidyl methacrylate and ethylenically unsaturated glycidyl ethers. Preferred α-olefins are those having from 2 to 8 carbon atoms such as ethylene, propylene and butene-1. Examples of the ethylenically unsaturated glycidyl ethers include, for example, glycidyl vinyl ether, allyl glycidyl ether and methallyl glycidyl ether.

In addition to α-olefin units and epoxy group-containing comonomer units, the olefin copolymer (B) may contain third comonomer units. Suitable third comonomers are those illustrated hereinabove in respect of the third comonomer of the ethylene-unsaturated carboxylic acid copolymer which is a starting material for the preparation of the ionomer (A), and include esters of unsaturated carboxylic acids and alkenyl esters of saturated carboxylic acids. Olefin copolymers (B) containing the third comonomer units may provide crosslinked ionomers having better transparency.

Preferred olefin copolymers which can be used herein comprise from 40 to 99% by weight, preferably from 50 to 98% by weight, of the α-olefin units, from 0.5 to 20% by weight, preferably from 1 to 15% by weight of the glycidyl group-containing comonomer units and from 0 to 49.5% by weight, preferably from 0 to 40% by weight of the third comonomer units. With olefin copolymers having unduly low content of the glycidyl group-containing comonomer units, the crosslinked ionomers, and in turn the final ionomer compositions, do not exhibit a satisfactorily reduced "luster reappearance" due to heat. Whereas olefin copolymers having excessively high content of the glycidyl group-containing comonomer units result in uneven crosslinking. Accordingly, the content of the glycidyl group-containing comonomer units in the olefin copolymer (B) should be desirably adjusted within the range prescribed above.

While the olefin copolymer (B) having epoxy groups in its side chains which can be used herein may be a random, block or graft copolymer, the random copolymer is preferred since it provides even crosslinking of the ionomer (A). Such a copolymer can be prepared by a random polymerization process under conditions including, for example, a pressure of from 500 to 3000 $kg/cm^2$ and a temperature of from 150 to 280° C.

Olefin copolymers wherein the α-olefin is ethylene preferably have a melt flow rate of from 0.01 to 1000 g/10 min, in particular from 0.1 to 200 g/10 min, as measured at a temperature of 190° C. and under a load of 2160 g.

The mechanism of the reaction between the ionomer (A) and the olefin copolymer (B) having epoxy groups in its side chains is supposed such that the carboxyl groups in the ionomer (A) react with the epoxy groups in side chains of the olefin copolymer (B) to form a crosslinked reaction product in which polymer chains of the ionomer are covalently connected via molecules of the olefin copolymer. Upon this reaction the carboxylic acid salt units in the ionomer appear to act as a catalyst. In this reaction no by-products such as water and gases are formed, and thus foaming due to by-products is not observed.

The reaction between the ionomer (A) and the olefin copolymer (B) is conveniently carried out by melt blending the reactants. While the reaction may be carried out in solution by dissolving and bringing the reactants in contact to each other in an appropriate solvent, this solution process requires a relatively long reaction time and an additional step of solvent removal. Accordingly, we prefer to the melt blending process. The melt blending may be carried out in a melt mixer or processing apparatus for thermoplastic resins at a temperature of from 100 to 300° C., preferably from 150 to 280° C.

The proportions of the reactants used in the preparation of the crosslinked ionomer are from 90 to 99.5% by weight, preferably from 92 to 99% by weight, of the ionomer (A) to from 0.5 to 10% by weight, preferably from 1 to 8% by weight, of the olefin copolymer (B) having epoxy groups in its side chains. With substantially less than 0.5 % by weight of the olefin copolymer (B) having epoxy groups in its side chains based on the total weight of the ionomer (A) and olefin copolymer (B), no appreciable reduction in "luster reappearance" of the crosslinked ionomer, and in turn the final ionomer composition, will be achieved. Whereas use of the olefin copolymer (B) substantially in excess of 10% by weight based on the total weight of the ionomer (A) and olefin copolymer (B) will result in excessive crosslinking, leading to a remarkable reduction in flowability and moldability of the crosslinked ionomer, and in turn the final ionomer composition.

The olefin-type thermoplastic elastomer (C) used herein comprises an ethylene-α-olefin copolymer rubber (a) and a polyolefin resin (b) as essential ingredients, with the proviso that at least one of the ingredients (a) and (b), normally the ethylene-α-olefin copolymer rubber (a), is partly crosslinked.

The olefin-type thermoplastic elastomer (C) can be a partly crosslinked rubber composition (I) obtained by partly crosslinking a mixture of the ethylene-α-olefin copolymer rubber (a) and the polyolefin resin (b); or a composition obtained by adding a further polyolefin resin (II) to the partly crosslinked rubber composition (I) above; or a composition obtained by adding the polyolefin resin (II) to a a partly crosslinked ethylene-α-olefin copolymer rubber. The material to be partly crosslinked, that is the ethylene-α-olefin copolymer rubber or the mixture of the ethylene-α-olefin copolymer rubber (a) and the polyolefin resin (b) may be incorporated with a peroxide-noncrosslinkable hydrocarbon rubber (c) and/or a mineral oil softener (d).

More particularly, examples of the olefin-type thermoplastic elastomer (C) include:

(1) a thermoplastic elastomer composition (I) obtained by dynamic heat treatment of a mixture comprising:
  (a) from 20 to 95 parts by weight, preferably from 80 to 30 parts be weight, of an ethylene-α-olefin copolymer rubber,
  (b) from 5 to 80 parts by weight, preferably from 20 to 70 parts by weight, of a polyolefin resin, and optionally
  from 0 to 100 parts by weight, preferably from 5 to 80 parts by weight, based on 100 parts by weight of the total weight of the (a)+(b), of at least one component selected from
  (c) peroxide-noncrosslinkable hydrocarbon rubbers and
  (d) mineral oil softeners in the presence of a crosslinking agent;

(2) a composition comprising 30 parts by weight of the thermoplastic elastomer composition (I) above and up to 70 parts by weight of a polyolefin resin (II), the total weight of (b) and [II] in the final composition being up to 80 parts by weight based on 100 parts by weight of the composition;

(3) a thermoplastic elastomer composition comprising:
  (I) from 95 to 20 parts by weight of a partly crosslinked ethylene-α-olefin copolymer rubber obtained by dynamic heat treatment of a mixture comprising:
    (a) an ethylene-α-olefin copolymer rubber, and
    from 0 to 100 parts by weight, based on 100 parts by weight of the ethylene-α-olefin copolymer rubber, of at least one component selected from
    (c) peroxide-noncrosslinkable hydrocarbon rubbers and
    (d) mineral oil softeners in the presence of a crosslinking agent, and
  (II) from 5 to 80 parts by weight of a polyolefin resin; and (4) a thermoplastic elastomer composition comprising:
  (I) from 80 to 20 parts by weight of a partly crosslinked ethylene-α-olefin copolymer rubber obtained by static heat treatment (for example hot pressing) of a mixture comprising:
    (a) an ethylene-α-olefin copolymer rubber, and
    from 0 to 100 parts by weight, based on 100 parts by weight of the ethylene-α-olefin copolymer rubber, of at least one component selected from
    (c) peroxide-noncrosslinkable hydrocarbon rubbers and
    (d) mineral oil softeners in the presence of a crosslinking agent, and
  (II) from 20 to 80 parts by weight of a polyolefin resin.

Of these, thermoplastic elastomer compositions (1), (2) and (3) are preferred.

The thermoplastic elastomer (C) used herein should be partly crosslinked. If a noncrosslinked elastomer composition is used, the resulting ionomer composition does not have a satisfactory resistance to heat deformation.

As the ethylene-α-olefin copolymer rubber (a) for preparing the partly crosslinked olefin-type thermoplastic elastomer (C), use can be made of substantially amorphous elastomers derived from ethylene and α-olefin having from 3 to 14 carbon atoms, such as ethylene-propylene copolymer rubbers, ethylene-propylene-nonconjugated diene terpolymer or quaternary polymer rubbers, ethylene-butadiene copolymer rubbers, ethylene-1-butene copolymer rubbers and ethylene-1-butene-nonconjugated diene terpolymer or quaternary polymer rubbers. Of these, ethylene-propylene copolymer rubbers and ethylene-propylene-nonconjugated diene terpolymer rubbers are particularly preferred. Examples of the nonconjugated dienes include, for example, dicyclopentadienes, 1,4-hexadiene, cyclooctadiene, methylenenorbornenes, 5-ethylidene-2-norbornene and 5-vinylnorbornene. Of these, dicyclopentadienes and 5-ethylidene-2-norbornene are preferred. These elastomers may be used alone or in combination.

The ethylene α-olefin copolymer rubbers (a) used herein preferably contain units derived from ethylene and α-olefin in such a molar ratio that ethylene units/α-olefin units is from 50/50 to 90/10, and more preferably from 70/30 to 85/15. When the copolymer rubbers (a) contain units derived from one or more nonconjugated dienes, in addition to units derived from ethylene and alphaolefin, a molar ratio of units derived from 1-olefin (ethylene +α-olefin having 3 or more carbon atoms) to units derived from one or more nonconjugated dienes is normally 99/1 to 90/10, and preferably from 97/3 to 94/6.

As the polyolefin resin (b) which is dynamically heat treated with the ethylene/α-olefin copolymer (a), use can be made of resinous high polymer substances including homopolymers of 1-olefins such as ethylene, propylene, butene-1, hexene-1 and 4-methyl-pentene-1, copolymers of at least two 1-olefins and copolymers of 1-olefins and up to 15% by mole of at least one other copolymerizable monomer, such as ethylene-vinyl acetate copolymers, ethylene-acrylic acid copolymers, ethylene-methyl acrylate copolymers, ethylene-ethyl acrylate copolymers, ethylene-methacrylic acid copolymers and ethylene-methyl methacrylate copolymers.

Of these, polyolefin resins having a melt flow rate of from 0.1 to 50 g/10 min., in particular from 5 to 20 g/10 min., as measured in accordance with ASTM-D-1238-65T (measured at 190° C. in cases of ethylene copolymers and at 230° C. in cased of propylene copolymers) and having a crystallinity index of at least 40%, as measured by X-ray diffractometry, are preferred.

As the polyolefin resin (b), particularly preferred are peroxide decomposable polyolefin resins having the above-specified melt flow rate and crystallinity. The term "peroxide-decomposable polyolefin resins" means that the polyolefin resins undergo cleavage of polymer chains to some extent to reduce molecular weight thereof and to increase in melt flow rate, when kneaded together with a peroxide under heat. Examples of such peroxide-decomposable polyolefin resins include, for example, isotactic polypropylene and copolymers of propylene with up to 15 mol % of other α-olefins such as propylene-ethylene copolymers, propylene-1-butene copolymers, propylene-1-hexene copolymers and propylene-4-methyl-1-pentene copolymers.

Blends of such peroxide-decomposable polyolefin resins with peroxide crosslinkable resins such as low, medium and high density polyethylenes having a density of from 0.910 to 0.940 g/cm$^3$ may also be used as the polyolefin resin (b) in the practice of the invention. The term "peroxide crosslinkable polyolefin resins" means that the polyolefin resins undergo crosslinking of polymer chains to some extent and decrease in melt flow rate when kneaded together with a peroxide under heat.

Examples of the peroxide-noncrosslinkable hydrocarbon rubbers (c), which can be used herein, include, for example, polyisobutylene rubbers, butyl rubbers, propylene/ethylene copolymer rubbers having a propylene content of at least 70% by mole, propylene-1-butene copolymer rubbers having a propylene content of at least 70% by mole and atactic polypropylenes. Of these, polyisobutylene and propylene-1-butene copolymer rubbers are preferred. By the term "peroxide-noncrosslinkable hydrocarbon rubbers" is meant that the hydrocarbon rubbers do not undergo crosslinking of polymer chain and do not decrease in melt flow rate even when they are kneaded in the presence of a peroxide under heat.

As the mineral oils (d), use can be made of paraffinic, naphthenic and aromatic high boiling petroleum fractions normally employed in rubber industry for a purpose of weakening intermolecular action of rubbers thereby facilitating roll processing thereof and promoting dispersion of carbon black or white carbon thereinto, or for a purpose of reducing hardness of vulcanized rubbers thereby enhancing flexibility or elasticity thereof.

As the polyolefin resin [II], which is optionally added to the partly crosslinked rubber composition [I] after the dynamic heat treatment, use can be made of those hereinbefore described with respect to the polyolefin resin (b), that is, homopolymers of 1-olefins such as ethylene, propylene, butene-1, hexene-1 and 4-methyl-pentene-1, copolymers of at least two 1-olefins and copolymers of 1-olefins and up to 15% by mole of at least one other copolymerizable monomer, such as ethylene-vinyl acetate copolymers, ethylene-acrylic acid copolymers, ethylenemethyl acrylate copolymers, ethylene-ethyl acrylate copolymers, ethylene-methacrylic acid copolymers and ethylenemethyl methacrylate copolymers. Of these, polyolefin resins having a melt flow rate of from 5 to 100 g/10 min., in particular from 10 to 50 g/10 min., as measured in accordance with ASTM-D-1238-65T (at 190° C., or at 230° C. in the case of polymers of propylene), are preferred. In cases wherein both the polyolefin resins (b) and (II) are added during and after the dynamic heat treatment, they may be the same or different.

The thermoplastic elastomer (C) may be prepared, for example, by providing a blend comprising from 100 to 20 parts by weight of an ethylene-α-olefin copolymer rubber (a), from 0 to 80 parts by weight of a polyolefin resin (b), and optionally from 0 to 100 parts by weight of a peroxide-noncross-linkable hydrocarbon rubber (c) and/or mineral oil softener (d), incorporating the blend with from about 0.05 to 2% by weight, preferably from 0.1 to 0.5% by weight, based on the weight of the blend, of a crosslinking agent and dynamically heat treating the resulting mixture to effect the partial crosslinking. The thermoplastic elastomer so prepared may be incorporated with an additional amount of a polyolefin resin (II), By the term "dynamic heat treatment of a blend" used herein is meant kneading the blend in molten condition. The kneading is preferably carried out using a closed apparatus under an atmosphere of an inert gas such as nitrogen and carbon dioxide. The kneading temperature is normally from 150 to 280° C., preferably from 170 to 240° C., and the kneading time is normally from 1 to 20 minutes, preferably from 1 to 10 minutes.

The crosslinking agents, which can be used herein, include organic peroxides, sulfur, phenolic vulcanizing agents, oximes and polyamines. Of these, organic peroxides and phenolic vulcanizing agents are preferred in view of properties of the resulting thermoplastic elastomers.

Examples of organic peroxides include, for example, dicumyl peroxide, di-tert.-butyl peroxide, 2,5-dimethyl-2,5-bis(tert.-butylperoxy)hexane, 2,5-dimethyl-2,5-bis(-tert.-butylperoxy)hexyne-3, 1,3-bis(tert.-butylperoxyisopropyl)benzene, 1,1-bis(tert.-butylperoxy)-3,3,5-trimethylcyclohexane, n-butyl-4,4-bis(tert.-butylperoxy)valerate, dibenzoyl peroxide and tert.-butylperoxy benzoate. Of course, bisperoxide compounds, in particular, 1,3-bis(tert.-butylperoxyisopropyl)benzene, is preferred in view of their less ill-smelling and scorch resistant properties.

Examples of the phenolic vulcanizing agents include, for example, alkylphenol-formaldehyde resins, triazine-formaldehyde resins and melamine-formaldehyde resins.

The thermoplastic elastomers used herein preferably have a Shore hardness A of not more than 95, preferably form 50 to 95 as measured in accordance with JIS K 7215, MFR of from 1 to 100 g/10 min, preferably from 5 to 70 g/10 min, measured at a temperature of 230° C. and under a load of 10 kg, and a flexural modulus of from 200 to 7000 kg/cm$^2$, preferably from 300 to 5000 kg/cm$^2$. Such thermoplastic elastomers are commercially available under trade names of MILASTOMER® (supplied by MITSUI Petrochemical Industries Ltd.), THERMOLAN® (supplied by MITSUBISHI Petrochemical Co. and Japan Synthetic Rubber Co., Ltd.) and SUMITOMO TPE® (supplied by SUMITOMO Chemical Co., Ltd.).

The ionomer composition according to the invention comprises a reaction product of the ethylene copolymer-type ionomer (A) with the olefin copolymer (B) having epoxy groups in its side chains, and from 5 to 200 parts by weight, preferably from 50 to 150 parts by weight, based on 100 parts by weight of said reaction product, of the olefin-type thermoplastic elastomer (C). With substantially less than 5 parts by weight of the thermoplastic elastomer (C) based on 100 parts by weight of the reaction product of (A) and (B), the resulting ionomer composition does not have a satisfactory flexibility. Whereas with substantially in excess of 200 parts by weight of the thermoplastic elastomer (C) based on 100 parts by weight of the reaction product of (A) and (B), the resulting ionomer composition does not have a satisfactory scratch resistance.

Since the crosslinking reaction of the ethylene copolymer-type ionomer (A) with the olefin copolymer (B) having epoxy groups in its side chains is not affected by the presence of the olefin-type thermoplastic elastomer (C), it is possible to melt extrude a blend of the ethylene copolymer-type ionomer (A), the olefin copolymer (B) having epoxy groups in its side chains and the olefin-type thermoplastic elastomer (C) thereby simultaneously effecting the crosslinking reaction of the ethylene copolymer-type ionomer (A) with the olefin copolymer (B) and the incorporation of the thermoplastic elastomer (C).

EXAMPLES

The invention will now be illustrated by the following Examples and Comparative Examples, in which the materials used and the testing methods and evaluations were as follows.

Ionomer 1 having an ethylene content of 97 mole %, a methacrylic acid content of 1 mole % and a zinc methacrylate content of 2 mole %.

Ionomer 2 having an ethylene content of 96 mole %, a methacrylic acid content of 1 mole % and a zinc methacrylate content of 3 mole %.

TPE 1, partly crosslinked olefin-type thermoplastic elastomer (MILASTOMER 8030 B ®, supplied by MITSUI Petrochemical Industries Ltd.) having an MFR of 0.5 g/10 min measured at 230° C. and under a load of 10 kg and a Shore A hardness of 85.

TPE 2, partly crosslinked olefin-type thermoplastic elastomer (MILASTOMER 6030 B ®, supplied by MITSUI Petrochemical Industries Ltd.) having an MFR of 25 g/10 min measured at 230° C. and under a load of 10 kg and a Shore A hardness of 60.

EGMA, ethylene-glycidyl methacrylate copolymer having a glycidyl methacrylate content of 8% by weight and an MFR of 6 g/10 min measured at 190° C. and under a load of 2160 g.

EVAGMA, ethylene-vinyl acetate-glycidyl methacrylate terpolymer having a vinyl acetate content of 4.5% by weight, a glycidyl methacrylate content of 8% by weight and an MFR of 6 g/10 min measured at 190° C. and under a load of 2160 g.

EnBAGMA, ethylene-n-butyl acrylate-glycidyl methacrylate terpolymer having a n-butyl acrylate content of 7% by weight, a glycidyl methacrylate content of 10% by weight and an MFR of 6 g/10 min measured at 190° C. and under a load of 2160 g.

M.F.R. (melt flow rate) of the ionomer composition was measured in accordance with JIS-K-6710 at a temperature of 190° C. and under a load of 2160 g.

Flexural modulus was measured on a test pies of a thickness of 2 mm in accordance with ASTM D-747.

Luster reappearance was measured as follows. A T-die extruded and embossed sheet (having a thickness of 0.2 mm) of an ionomer composition was laminated with a 30 times expanded polypropylene foam sheet having a thickness of 2 mm. The laminated sheet was caused to stand in an oven maintained at a temperature of 120° C. for a period of 25 hours. At the end of the period, change of appearance of the embossed surface was observed and evaluated according to the following keys: A: no change in appearance, C: get lustrous again due to loss of emboss; and B: intermediate.

Scratch resistance was measured as follows. The embossed surface of the laminated test sheet mentioned above was rubbed with a notched side of a coin, and a liability of being impaired of the surface of the test sheet was visually observed and evaluated according to the following keys: A: not impaired, C: impaired; and B: intermediate.

EXAMPLES 1 TO 6 AND COMPARATIVE EXAMPLES 1 TO 4

A mixture of Ionomer 1, TPE 1 and EVAGMA in amounts indicated in Table 1 was extruded through a single screw extruder having a diameter of 40 mm under conditions including a die temperature of 200° C. and a number of screw rotation of 30 rpm to provide pellets. The pellets were extruded through a single screw extruder having a diameter of 65 mm equipped with T-die having a width of 700 mm at a T-die temperature of 200° C. to a sheet having a thickness of 0.2 mm, which was then caused to pass through a nip of metallic embossing roll. The embossed sheet was laminated with a 30 times expanded polypropylene foam sheet having a thickness of 2 mm. On the so prepared embossed laminated sheet, "luster reappearance" and scratch resistance were tested. On pellets prepared by the single screw extruder having a diameter of 40 mm, the M. F. R. was measured. The pellets were hot pressed at a temperature of 160° C. to provide a test piece having a thickness of 2 mm, on which the flexural modulus was determined.

Results are shown in Table 1.

EXAMPLE 7

Example 2 was repeated except that the Ionomer 1 was replaced with Ionomer 2. The results are shown in Table 1.

EXAMPLE 8

Example 2 was repeated except that the TPE 1 was replaced with TPE 2. The results are shown in Table 1.

EXAMPLE 9

Example 2 was repeated except that the EVAGMA was replaced with EGMA. The results are shown in Table 1.

EXAMPLE 10

Example 2 was repeated except that the EVAGMA was replaced with EnBAGMA. The results are shown in Table 1.

TABLE 1

|  | Ex. 1 | Ex. 2 | Ex. 3 | Ex. 4 | Ex. 5 | Ex. 6 |
|---|---|---|---|---|---|---|
| Proportions (parts by wt.) | | | | | | |
| Ionomer 1 | 98 | 98 | 98 | 96 | 94 | 92 |
| Ionomer 2 | | | | | | |
| EVAGMA | 2 | 2 | 2 | 4 | 6 | 8 |
| TPE 1 | 50 | 100 | 150 | 100 | 100 | 100 |
| M.F.R (g/10 min) | 0.10 | 0.11 | 0.09 | 0.08 | 0.04 | 0.02 |
| Flexural modulus (MPa) | 150 | 105 | 94 | 110 | 115 | 120 |
| Luster reappearance | A | A | A | A | A | A |

TABLE 1-continued

| | | | | | | |
|---|---|---|---|---|---|---|
| Scratch resistance | A | A | A~B | A | A | A |

| | Com. Ex. 1 | Com. Ex. 2 | Com. Ex. 3 | Com. Ex. 4 | Ex. 7 | Ex. 8 | Ex. 9 | Ex. 10 |
|---|---|---|---|---|---|---|---|---|
| Proportions (parts by wt.) | | | | | | | | |
| Ionomer 1 | 100 | 88 | 98 | 98 | | 98 | 98 | 98 |
| Ionomer 2 | | | | | 98 | | | |
| EVAGMA | | 12 | 2 | 2 | 2 | 2 | | |
| EGMA | | | | | | | 2 | |
| EnBAGMA | | | | | | | | 2 |
| TPE 1 | 100 | 100 | 10 | 250 | 100 | | 100 | 100 |
| TPE 2 | | | | | | 100 | | |
| M.F.R (g/10 min) | 1.2 | not flow | 0.12 | 0.10 | 0.14 | 0.08 | 0.10 | 0.05 |
| Flexural modulus (MPa) | 98 | (*) | 195 | 72 | 85 | 95 | 112 | 100 |
| Luster reappearance | C | (**) | C | A | A | A | A | A |
| Scratch resistance | A~B | (**) | A | C | A | A | A | A |

*impossible to prepare a test piece
**impossible to mold a sheet due to high extrusion load

What is claimed is:

1. An ionomer composition which comprises a reaction product of from 90 to 99.5% by weight of an ethylene copolymer ionomer (A) comprising ethylene units and unsaturated carboxylic acid salt units with from 0.5 to 10% by weight of an olefin copolymer (B) having epoxy groups in its side chains, and from 5 to 200 parts by weight, based on 100 parts by weight of said reaction product, of an olefin thermoplastic elastomer (C) comprising an ethylene α-olefin copolymer rubber (a) and a polyolefin resin (b), at least one of (a) and (b) being partly cross-linked.

2. The polymer composition according to claim 1 wherein said ethylene copolymer ionomer (A) is obtained by neutralizing from 10 to 90% of carboxylic groups of an ethylene copolymer comprising ethylene units, unsaturated carboxylic acid units and optionally unsaturated carboxylic acid ester units with metallic ions having a valency of from 1 to 3.

3. The polymer composition according to claim 1 wherein said olefin copolymer (B) having epoxy groups in its side chains is a copolymer of at least one α-olefin with at least one ethylenically unsaturated glycidyl compound selected from glycidyl acrylate, glycidyl methacrylate and ethylenically unsaturated glycidyl ethers.

4. The polymer composition according to claim 1 wherein said olefin thermoplastic elastomer (C) comprises:

[I] from 100 to 30 parts by weight of a partly cross-linked rubber composition obtained by dynamic heat treatment of a mixture comprising:
  (a) from 20 to 95 parts by weight of an ethylene-α-olefin copolymer rubber,
  (b) from 5 to 80 parts by weight of a polyolefin resin, the total weight of the (a)+(b) being 100 parts by weight, and
  from 5 to 80 parts by weight of at least one component selected from
  (c) peroxide-noncrosslinkable hydrocarbon rubbers and
  (d) mineral oil softeners in the presence of a cross-linking agent, and

[II] from 0 to 70 parts by weight of a polyolefin resin, the total weight of (b) and [II] in the elastomer (C) being from 5 to 80 parts by weight based on 100 parts by weight of the elastomer (C).

* * * * *